No. 633,098. Patented Sept. 12, 1899.
F. A. MILLER.
ACETYLENE GAS GENERATOR.
(Application filed May 19, 1898.)
(No Model.) 3 Sheets—Sheet 1.
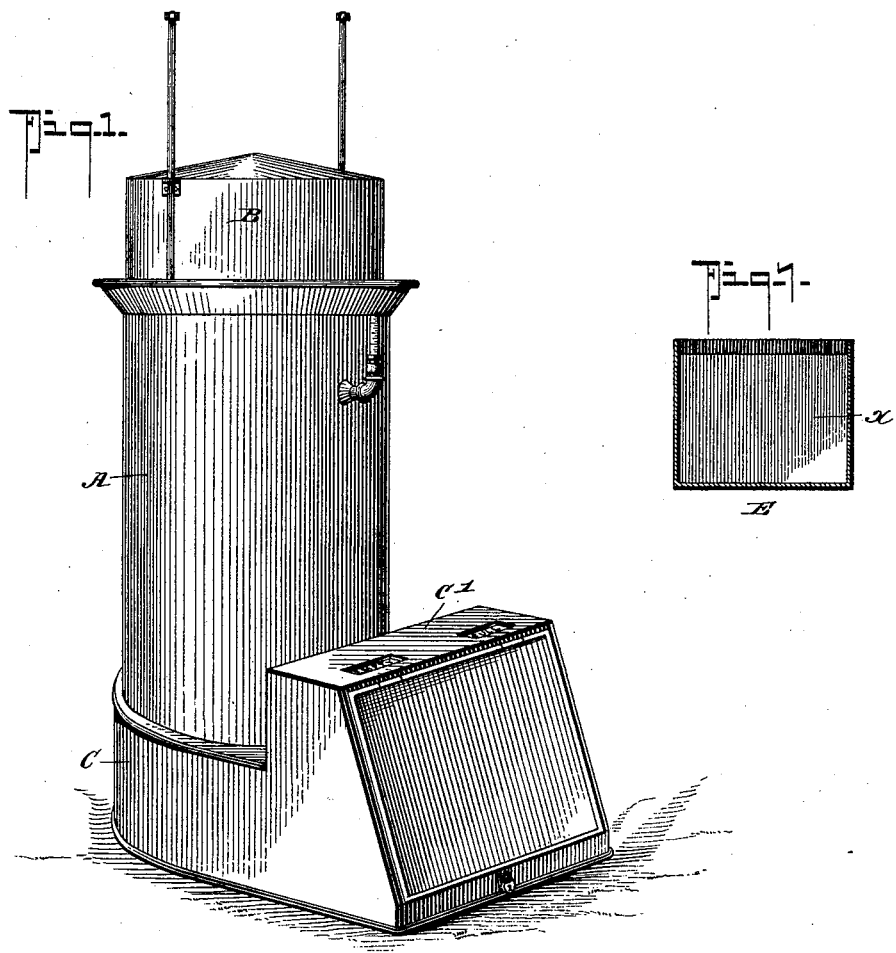
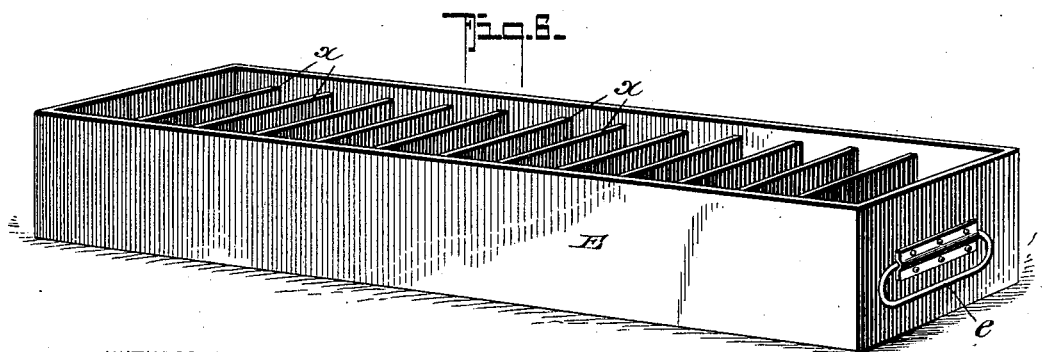
WITNESSES:
H. G. Dieterich
E. McCormic
INVENTOR
Frank A. Miller
BY
Fred G. Dieterich & Co.
ATTORNEYS

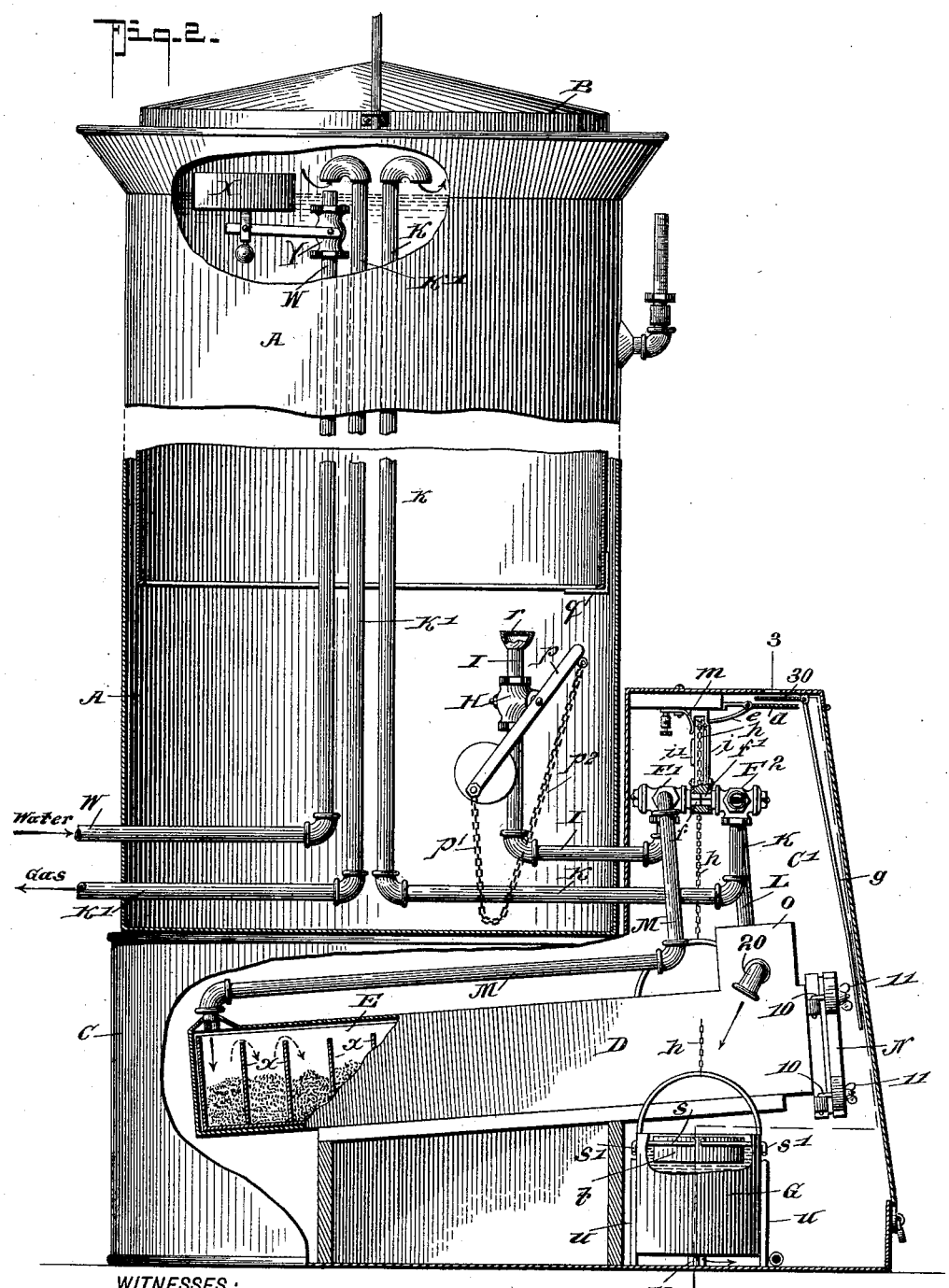

No. 633,098. Patented Sept. 12, 1899.
F. A. MILLER.
ACETYLENE GAS GENERATOR.
(Application filed May 19, 1898.)
(No Model.) 3 Sheets—Sheet 3.
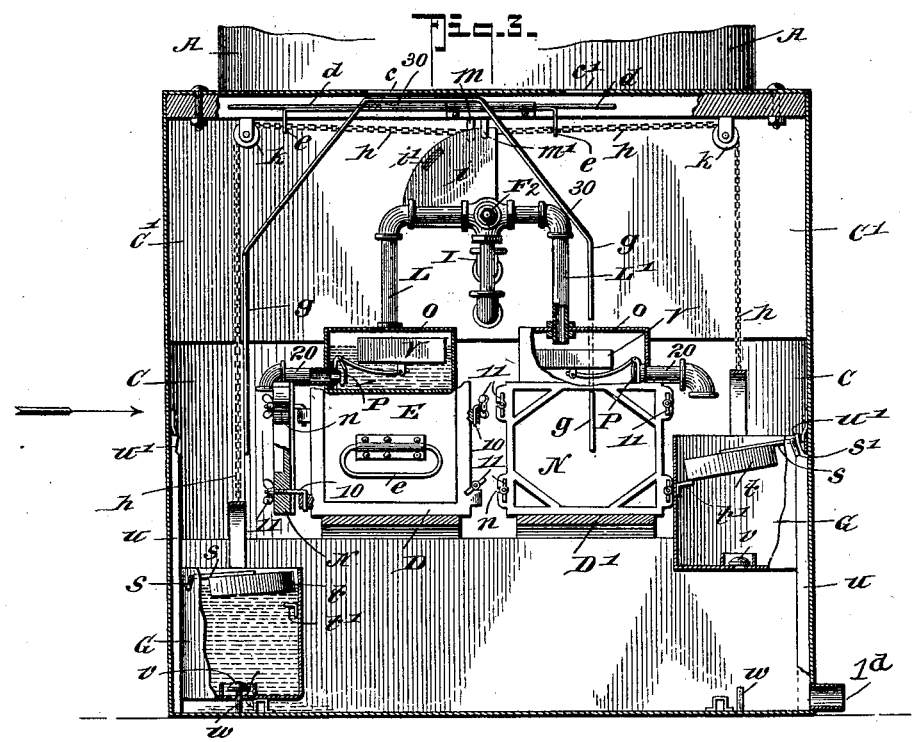
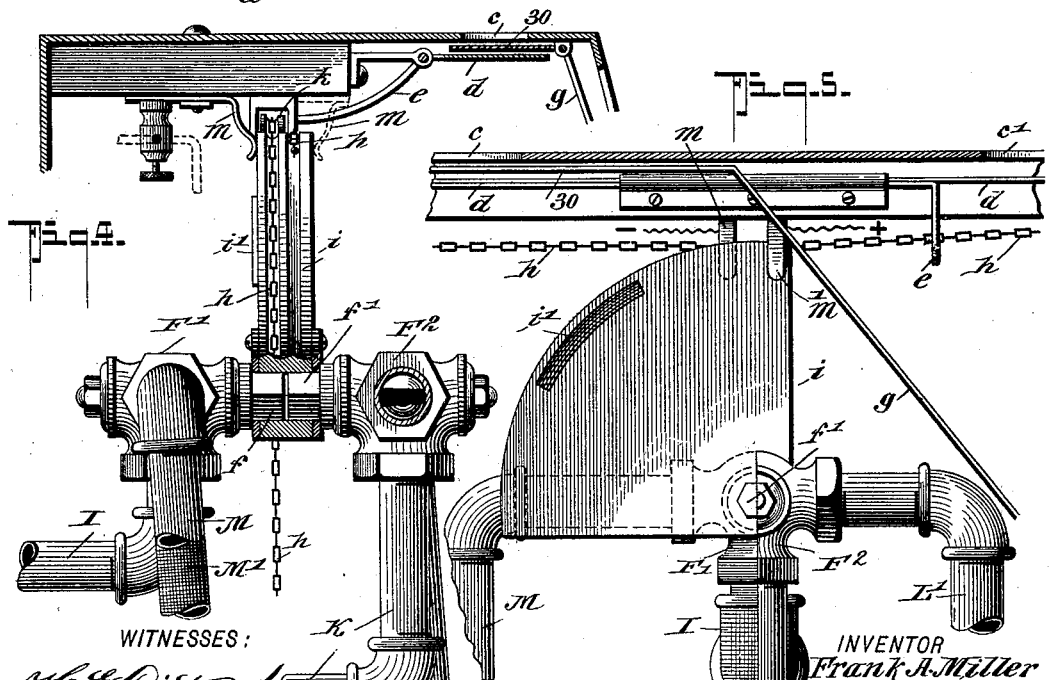
WITNESSES:
H. G. Dieterich
E. McCormic
INVENTOR
Frank A. Miller
BY
Fred G. Dieterich & Co.
ATTORNEYS

United States Patent Office.

FRANK A. MILLER, OF DALLAS, TEXAS.

ACETYLENE-GAS GENERATOR.

SPECIFICATION forming part of Letters Patent No. 633,098, dated September 12, 1899.

Application filed May 19, 1898. Serial No. 681,151. (No model.)

*To all whom it may concern:*

Be it known that I, FRANK A. MILLER, residing at Dallas, in the county of Dallas and State of Texas, have invented a new and Improved Acetylene-Gas-Generating Machine, of which the following is a specification.

This invention, which relates to improvements in the construction of machines of the character noted, primarily seeks to provide a generating mechanism which will generate the gas only as it is being consumed and practically not generate an excess quantity and in which the operation of starting and stopping the generating means is automatically effected.

The invention also comprehends a construction whereby easily-manipulated means are provided for facilitating a recharging of the machine with a fresh supply of carbid while such machine is in operation and without affecting such operation or the burning of any lights supplied therefrom.

Another object of this invention is to dispense with all turning of valves by hand when recharging, so that the machine may be placed in the hands of inexperienced persons without possible danger or chance of making mistakes when recharging.

Among other objects this invention seeks to provide for inclosing all of the working parts within the base of the machine and for holding such parts from view by means of a suitably-arranged door which when locked will prevent tampering with such working parts and when open admit of ready access thereto, providing an indicator device for disclosing the condition of the machine, and an alarm mechanism operating to indicate when the machine needs recharging.

Again, this invention provides in connection with the gasometer a duplex generating means connected therewith by suitable switch-valve mechanisms common to both generating means and automatically operated as one generator becomes exhausted to cut out such exhausted generator from the gasometer or holder and place the fresh or charged generator in communication with such holder.

In its subordinate features this invention consists in certain novel details of construction and peculiar combination of parts, all of which will be first described in detail and then be specifically pointed out in the appended claims, reference being had to the accompanying drawings, in which—

Figure 1 is a perspective view of my improved machine complete. Fig. 2 is a side elevation, parts being in section, as seen in the direction indicated by the arrow in Fig. 3. Fig. 3 is a front view of the base portion or generator mechanism, part being in section, the view being taken practically on the line 3 3 of Fig. 2. Fig. 4 is a detail side elevation, on an enlarged scale, parts being in section, illustrating the electric alarm-contacts, the indicator devices, and the switch-valve mechanisms. Fig. 5 is a front view of the parts shown in Fig. 4, the left gas offtake-pipe being omitted. Fig. 6 is a view of one of the removable carbid-holders, and Fig. 7 is a transverse section thereof.

In the practical construction of my improvement the gasometer or holder and the generating-compartment are compactly arranged and form substantially a single shell or casing, of which the generating-compartment forms the base for the gas-holder, which rises up from the rear therefrom, but is held separate therefrom.

In its general construction the generating mechanism is of a duplex character, two distinct and independently-operating generating-compartments being provided, each of which communicates with the interior of the holder by two distinct outlets, one for conveying the gas to the holder as it is being generated and the other for feeding water from the holder to the generator-compartment. A gas-lead and the water-feed of the two compartments, which communicate through automatically-operated valve mechanisms (one for the water and the other for the gas) common to both compartments, and which are operated automatically in unison, whereby to simultaneously close off one generating-compartment from the holder as the other compartment is put into communication therewith, the water-feed pipe common to both compartments having a cut-off valve normally held to its closed position and opened by the drop of the movable gasometer-section, which engages it as soon as the gas within it has been sufficiently exhausted to admit of its dropping in contact with such cut-off valve.

Each compartment consists of a generating-chamber having a supplemental chamber with which the gas-offtake communicates, a hinged door, and a detachable carbid-holder adapted to be slid into the generating-chamber. This holder has a series of transversely-arranged carbid-holder pockets or sections having stepped relation to each other from their inner to their outer end, whereby to produce a series of distinct and separate generating-sections adapted to be successively brought into an operative condition by reason of the water-feed, which is arranged to first saturate and extract the gas from one carbid-section before it passes off into the next section, whereby each single compartment operates intermittently to generate only enough gas to keep up a required supply within the holder.

The supplemental compartment of each generator is so disposed that the water after it has saturated the carbid held in such generator will rise therein and operate on a float-valve normally held closed, and thereby allow for the escape of the water held in such supplemental compartment which is utilized to operate a suitably-arranged shifting mechanism which adjusts the valve devices for the gas and water outlets, cuts out the exhausted generator devices, and sets in operation the other or fresh generating device, and at the same time operates the alarm and partially governs the indicator devices, the operation of which is completed by hand manipulation when the operator opens the door of the exhausted compartment to turn off the waste or exhausted carbid to refill the holder.

Having thus generally outlined the construction of my improvements, I shall now proceed to describe the complete mechanism in detail, it being understood that like numerals and letters indicate like parts in all the figures.

The gasometer consists of a stationary holder or tank A, preferably cylindrical, and the gas-collector B, the lower end of which is open and is normally held submerged in the water, which enters the holder through the pipe W, the supply being cut off by the float-operated valve devices X Y, arranged as clearly shown in Fig. 2. The base consists of a rearwardly-extending portion C, upon which the tank is mounted, and a front upwardly-extending member C', in which and the portion C the working parts are held, such casing and the gasometer-casing being formed of any suitable material, preferably of galvanized iron.

D D' indicate a pair of generating-chambers which extend parallel under the tank and are held inclined, so that their rear ends are lower than their front ends, the purpose of which will presently appear, the said front end being open and provided with hinged doors N, having suitable clamp devices whereby they can be quickly opened and held closed air-tight, such clamp devices comprising a hinge-bolt 10, having winged nuts 11, the bolts fitting the slotted wings $n$ on the doors when the parts are at their closed position, as clearly shown in Fig. 3. Under each generator-chamber is detachably held a carbid-holder in the nature of an elongated drawer of a size to closely fit within such chambers and of a length substantially the same, the front ends having suitable handles $e$, whereby the drawers can be readily slipped out when desired. Each drawer E has a series of water-tight transverse partitions $x\,x$, whose upper edges are lower (about one-half inch) than the sides of the drawer, the purpose of which will presently appear. At the front ends the chambers D D' have each supplemental or enlarged compartments O O, with which the gas-chamber pipes L L' connect, which pipes also connect with the three-way switching-valve $F^2$, with which the gas-lead pipe K joins and which extends into the gasometer and discharges at a point above the water-line.

K' indicates a gas escape or service pipe.

I indicates a water-feed pipe disposed within the tank and held submerged, its upper end having a screened mouth $r$, while its lower end connects with the three-way valve F', with which the lateral or distributer pipes M M' connect and which discharge into the rearmost end of the generating-chambers, as best shown in Fig. 2, by reference to which and Figs. 4 and 5 it will also be seen that the two valves F' $F^2$ are connected to a single shifting mechanism which operates to alternately shift the valves only when one of the generating mechanisms has become exhausted. The hubs $f\,f'$ of the valves F' $F^2$ have a fixed connection with a segment $i$, having as its axis the abutment-hubs $f\,f'$. To this shifting member is connected the chain $h$, the opposite ends of which pass through guide-rollers $k$ and connect with the alternate operating-buckets G, the alternate drop action of which operates on such valves, as will presently appear. Each bucket G has a float $t$, provided with a transversely-disposed hinged rod $s$, the outer ends of which terminate in cranks forming lock-catches $s'$, which when the bucket is empty after being elevated automatically moves into locked engagement with the notched rests $u'$ on the vertical guides $u$, as clearly shown at the right of Fig. 3. $t'$ indicates a rest in the bucket G for limiting the outward movement of the float $t$. The bottom of each bucket has a discharge and a valve seat in which operates a gravity-valve $v$, which is moved to its open position by engagement with a lift-pin $w$ at the bottom of the casing C'. Within each supplemental compartment O is held a float V, connected with the valve P, which normally—that is, when no water is in the compartment O— closes off the discharge-pipe 20, held to empty into the bucket G, adjacent thereto.

$m\,m'$ indicate a pair of contacts which form the terminals of the electrical circuit for operating an alarm, (not shown,) which contacts are so arranged as to be brought into a closed circuit at each shifting movement of the member $i$, which has a contact-piece $i'$ for engaging the said terminals $m\ m'$.

The top of the casing-section C' has a pair of openings $c\ c'$, under which operates a reciprocating slide-plate $d'$, on which appear the words "Full," "Empty," "Empty," "Full," so disposed that when the word "Empty" appears through the right-hand opening $c$ the word "Full" will appear through the left-hand opening, and vice versa. The spacing of the words on the slide and the distance of the reciprocal movement corresponds to the distance which the chain moves back and forth. $e\ e'$ indicate brackets for connecting the slide $d$ to the chain.

30 indicates a short slide, on which at each end appears the word "Full." This slide operates between the long slide $d$ and the opening $c\ c'$ and has for its purpose to shut off the word on the long slide $d$ appearing through the opening $c$, at the end of which it (the short slide) is moved to cause the word "Full" to appear at such end. The slide 30 has a pendent arm $g$ at each end, which arms alternately extend down in front on the doors N N. The object of the slide 30 is as follows: When the slide $d$ is shifted by reason of movement of the chain $h$, the word "Empty" will be caused to appear above the generator-chamber just exhausted. Before the door N of such exhausted chamber can be opened the arm $g$ (which at this time extends in front of it) must be moved to one side, thus moving the short slide to bring the word "Full" over the chamber to be now filled instead of the word "Empty." At the same time this is done it causes the other arm $g$ to move in front of the other door N to effect the same operation on the other generating-chamber when it is exhausted. By this arrangement it is impossible to recharge the exhausted chamber without registering unless it has been so done, a glance at the openings $c$ being all that is necessary to ascertain the condition of the machine.

Having thus described the detail construction of my invention, the operation thereof is best explained as follows: As gas is being conveyed from the gasometer B through the service-pipe to the burners such gasometer will descend within the tank A until the projecting plate $q$ on the lower edge thereof strikes and depresses the trip-lever $p$, which opens the cock H, located in the water-pipe I, which allows the water to flow through such pipe, the switching-valve F', and the pipe M into the lowest end of the generating-chamber D and into the first section of the carbid-drawer E, slaking some of the carbid it contains and generating gas, which as it is thus generated rises and flows to the forward end of the generating-chamber into the supplemental compartment O and passes out through the pipe L connected therewith, switching-valve $F^2$, and pipe K into the gasometer B. This pressure of gas at once lifts the gasometer from engagement with the lever $p$, the movement of which in transverse directions is limited by the stay-chains $p'\ p^2$, (see Fig. 2,) which permits the cock H to assume its normal position by reason of its being weighted, and thereby shut off the water-supply to the generating-chamber D, which stops the generation of gas. The several compartments in the drawer E successively fill one at a time—that is to say, after sufficient water has entered into the first section to overflow it, it will enter the next section and slake the carbid held therein, and then the next, operating likewise, and so on until the last section has been reached. Thus it will be seen that only a small quantity of the carbid is slaked at a time. When the last section at the upper end of the carbid has been exhausted and no more gas is generated to lift the gasometer B off from the trip-lever $p$, the water will continue to flow into compartment D until it rises in the supplemental compartment O enough to lift the float V, which operation will open the valve P and allow the water in such supplemental compartment O to flow into the pail G, adjacent thereto, until it fills, when the float-valve $t$ therein will rise sufficient to unlock the pail from its support, which pail then descends, and as it thus moves it switches the segment $i$, and thereby cuts off both water and gas connections between the exhausted generating-chamber and the gasometer and at the same time opens up such connections to the other or charged generating-chamber with the said gasometer. The bucket in descending also shifts the signs in the openings of the casing-top and rings the alarm, it being understood that if desired connections can also be made with the annunciator arranged at any distant point, which may also be operated by the switching devices. The water which drains from the buckets G by reason of the pins $w$ lifting and opening the valves $v$ escapes from the machine through a discharge-pipe $l^a$, located at one side of the portion C, as clearly shown in Fig. 3 of the accompanying drawings. The water within the empty generating-chamber is either removed with the drawer or it will escape through the open door and drain off through the discharge-pipe $l^a$, and the water contained within the drawer can be readily emptied.

I am aware that acetylene-gas-generating machines have been provided having the water-tank and gasometer arranged substantially the same as the construction shown in the drawings, and I am also aware that machines of this character have been made in which two generating-chambers have been provided; but so far as I know such generating-chambers have depended in their operation upon hand-set valve mechanism, and my invention so far as it relates to the generating mechanism differentiates from duplex generating means heretofore provided in that the operation of shifting the charged one into use and cutting off the exhausted one is automatically effected.

It will be understood that changes in the details of construction and modifications in the several parts described and shown may be readily made without departing from the scope of the appended claims.

Having thus described my invention, what I claim, and desire to secure by Letters Patent, is—

1. In an acetylene-gas-generating means; in combination with the gas-holder and a water-supply governed by the rise and fall of the said holder to intermittently charge the generator; a generator having a series of carbid-holding pockets adapted to be successively submerged, a supplemental gas-collecting compartment communicating with the generating-pockets, having a valve offtake connection with the gas-holder; means for cutting off the water-supply, and an offtake from the supplemental gas-collecting compartment governed by the rise and fall of water in the generator after all of the carbid held therein has been exhausted.

2. In an acetylene-gas-making machine, the combination of a gasometer, a duplex set of generators, each having a water-supply and a gas-offtake communicating with the gasometer, a switch-valve mechanism common to both offtakes, a switch-valve mechanism common to both water-supplies, and means governed by the excess flow of water into the generators for shifting both switch-valve mechanisms in unison, whereby to cut out the exhausted generator and bring the other into an operative condition, substantially as described.

3. In an acetylene-gas-making machine, the combination of a generator, a duplex set of generators each having a water-supply and a gas-offtake communicating with the gasometer, a switch-valve mechanism common to both offtakes, a switch-valve mechanism common to both water-supplies, an indicator arranged at the generators and connected with the switch-valve mechanisms, and means governed by the excess flow of water into the generators for shifting both switch-valve mechanisms in unison, whereby to cut out the exhausted generator and bring the other into an operative condition, and simultaneously operating the indicator, substantially as described.

4. In an acetylene-gas-making machine, the combination of a gasometer, a duplex set of generators having doors and provided with removable drawers arranged at a slight inclination and having series of pockets arranged to be successively submerged, a gas-offtake and a water-supply for each of the generators communicating with the gasometer, a switch-valve mechanism common to both offtakes, a switch-valve mechanism common to both water-supplies, an indicator connected with the switch-valve mechanisms, and means governed by the excess flow of water into the generators for shifting both switch-valve mechanisms in unison, whereby to cut out the exhausted generator and bring the other into operative condition and simultaneously operating the indicator, substantially as described.

5. In the manufacture of acetylene gas; in combination; a gasometer; a duplex set of generators; an indicator; an alarm mechanism; each generator having a water-supply and a gas-offtake communicating with the gasometer; a switch-valve mechanism common to both offtakes; a switch-valve common to both water-supplies; shifting devices for operating the alarm; an indicator connected with such switch-valve mechanisms, and means governed by the excess flow of water into the generator for shifting both switch-valve mechanisms in unison, whereby to cut out the exhausted generator and bring the other into an operative condition and simultaneously operating the indicator and alarm devices, as set forth.

6. In an acetylene-gas generator, the combination with the gas-holder, a generator and a water-supply governed by the rise and fall of said holder to charge the generator intermittently, a gas-collecting chamber in communication with the generator having a valved offtake connection with the holder, means for cutting off the water-supply, and an offtake from the collecting-chamber governed by the rise of water in the generator after all the carbid held therein has been exhausted, substantially as described.

7. In an acetylene-gas-making machine, the combination of a gasometer, a duplex set of generators each having a water-supply and a gas-offtake communicating with the gasometer, a switch-valve mechanism common to both offtakes, a switch-valve mechanism common to both water-supplies, the supplemental chambers O, having valved outlets, floats for operating the same, buckets connected with the valve-shifting mechanisms, said buckets having automatically-released escape-valves, and float-valves having lock catches and detents connected with the casing, substantially as described.

8. An acetylene-gas-generating apparatus, comprising a casing formed of a horizontal rear portion; a vertically-extended front portion having a door; a gasometer mounted upon the horizontal portion of such casing, consisting of a water-tank, and the collector or float movable therein; a pair of laterally-disposed generating-chambers held within the casing, their front ends having horizontal doors, and gas-collecting compartments; carbid-holders each consisting of a drawer having a series of transverse partitions communicating with each other at the upper edge, said drawers being slidable within the generator-chambers; a water-supply pipe extended within the water-space of the gasometer, and having a cut-off valve normally held to its closed position and adapted to be moved to its open position by the drop of the gas-holder, said pipe having laterals discharging into the rear end of the generating-chambers and having a three-way valve F'; the offtake-pipes L; the three-way valve F², connecting such pipes; the intake-pipe K; and means for shifting the valves F' F², in unison, substantially as shown and for the purposes described.

9. In an apparatus for the purposes described; in combination with the gasometer and the generators; said generators having supplemental chambers O; the valve-water-feed pipe I; the laterals M; the offtakes L; the intake K, and the three-way valves F' F², arranged substantially as shown, said valves having an oscillating shifting member; of the valved outlets connected with the generator-chambers O; the floats V, within such chambers; the buckets G and operating-chains h, connecting them with the valve-shifting member, said buckets having automatically-released escape-valves; and float-valves having lock catches and detents u', connected to the casing, all being arranged substantially as shown and for the purposes described.

10. In an apparatus as described; the combination with the gasometer, and means for maintaining the water therein at practically the same level; a casing comprising a horizontal portion extended under and forming a support for the gasometer, and having a front portion extended vertically, the front being a hinged door; a pair of rearwardly and downwardly extending generator-chambers, having hinged doors at the front; a water-supply pipe extended within the water-space of the gasometer, having a valve normally held closed and adapted to be moved to its open position when the gas-holder reaches its lowermost or exhausted position; laterals connecting such pipe with the rear or lower ends of the generating-chambers; a three-way valve connecting such laterals with the water-supply pipe; carbid-holders detachably held within the generator-chambers, said holders having a series of transverse partitions, communicating at their upper edge with each other; offtakes connected with the generating-chambers and joined by a three-way valve with an intake-pipe, opening within the gasometer at a point above the water-line, all being arranged substantially as shown and for the purposes described.

11. In an acetylene-gas-generating means substantially as described; the combination with the gasometer, and the two generators connected therewith, substantially as shown, said generators having hinged doors at the front, and detachable or sliding carbid-holding drawers; the casing inclosing such generators having indicator-openings, and an indicator-slide having pendent arms g, adapted to be alternately moved so that one of such arms will at all times be in front of either one of the doors of the generating-chambers, as specified.

12. The combination with the gasometer A B and casing C'; the generating-chambers D D'; the water-supply and the offtake-pipes arranged substantially as shown; and the three-way valves F' F², connected therewith, said valves being arranged to operate in unison; the casing-section C', having indicator or sight openings; of the shifting member I, and the indicator-plate d, connected therewith, all being arranged substantially as shown and for the purposes described.

13. In an acetylene-gas-generating apparatus, having a duplex set of generators adapted to be alternately brought into an operative condition, each having a water-supply pipe and offtake-pipes; the water-supply pipes of the two generators connecting with the service-pipe by a three-way valve, and the offtake-pipes connecting with the intake-pipe, for the gasometer by a similar three-way valve, and shifting devices connecting both valves to move them in unison; of tripper mechanism, consisting of a pair of buckets, one for each generator; a cable for suspending such buckets, connected with the valve-shifting member, each generator having a water-overflow adapted to discharge in the bucket held adjacent thereto, said buckets having lock-catches adapted to be automatically engaged with detents, whereby to hold the buckets in their elevated position; floats within the buckets, said buckets having escape-valves adapted to engage trippers as they drop to their lowermost position, all being arranged substantially as shown and described.

FRANK A. MILLER.

Witnesses:
C. M. BOLLES,
C. COLLINS.